United States Patent
Steelman et al.

(10) Patent No.: US 6,311,399 B1
(45) Date of Patent: Nov. 6, 2001

(54) MULTI-PIN AIR RELEASE TOOL AND METHOD

(75) Inventors: Ronald S. Steelman, Woodbury; John R. David, Stillwater, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/412,665

(22) Filed: Oct. 5, 1999

(51) Int. Cl.[7] .................................. B26F 1/24; B26F 1/32
(52) U.S. Cl. ................................. 30/366; 30/365
(58) Field of Search ........................ 30/358, 365, 366; 83/348, 660, 867

(56) References Cited

U.S. PATENT DOCUMENTS

| | | | |
|---|---|---|---|
| 326,160 | * 9/1885 | Seaver et al. | 30/366 |
| 3,389,466 | 6/1968 | Parris | 30/366 |
| 3,431,616 | * 3/1969 | Lewis | 30/365 |
| 3,763,563 | * 10/1973 | Ott et al. | 30/365 |
| 4,274,202 | * 6/1981 | Petrick | 30/365 |
| 4,326,909 | * 4/1982 | Slavik | 83/660 |
| 4,459,891 | 7/1984 | Kies et al. | 83/867 |
| 5,497,556 | * 3/1996 | Lebessis | 30/365 |

FOREIGN PATENT DOCUMENTS

| | | |
|---|---|---|
| 24 07 869 | 9/1975 | (DE) . |
| 5-016600 | 1/1993 | (JP) . |
| 6-335898 | 12/1994 | (JP) . |

OTHER PUBLICATIONS

Brady, H., "Ten Steps to Successful Vinyl Truck Lettering", *SignCraft Magazine*, Issue 74, Jan./Feb. 1994.

* cited by examiner

Primary Examiner—Hwei-Slu Payer
(74) Attorney, Agent, or Firm—James D. Christoff; Dale A. Bjorkman

(57) ABSTRACT

Tools and methods for releasing air entrapped between sheeting material and a substrate around a rivet are disclosed. The tools include movable pins biased outwardly by a resilient member. As a result, the pins can retract when encountering a discontinuity on an otherwise planar surface, such as a rivet, while still allowing for perforation of the sheeting around the rivet.

20 Claims, 3 Drawing Sheets

MULTI-PIN AIR RELEASE TOOL AND METHOD

FIELD OF THE INVENTION

The present invention relates to the release of entrapped air from beneath sheeting materials. More particularly, the present invention provides a tool including a plurality of resiliently biased pins designed to perforate the sheeting, thereby releasing entrapped air.

BACKGROUND OF THE INVENTION

Graphics are often produced by imaging plastic films using methods such as screen printing, cutting, electrostatic printing, or inkjet printing. These graphics are adhered to surfaces such as cars, buses, trucks, walls, billboards, etc. When plastic film is used for fleet decoration, it is typically applied over the rivets that are used to assemble the trailer or vehicle bodies. To provide a high quality graphic appearance, the film should be intimately adhered to the surface around the rivets. Because the rivets are raised from the surrounding surface, air is trapped under the film around each rivet. The air must be removed from the pocket around the rivet before the film can be completely adhered to the area around the rivet. Typically, the film is perforated using a single needle, often referred to as an air release tool. Often, four or more holes are made in the film immediately surrounding the rivet using the air release tool. This process is time consuming and physically demanding.

Multiple point pins have been developed that will punch multiple holes with a single application of pressure. The pins are arranged in a circular row around a central plunger that is free of pins. In some tools, the plunger may be spring-loaded such that it moves inwardly as pressure is applied to the tool. The plunger may also include a concave depression to facilitate alignment of the tool over a rivet. This tool may reduce the time for perforating the film around rivets as compared to a single-needled tool, but the pins must be carefully aligned such that no single pin strikes the head of the rivet or all the other pins will be prevented from making contact and perforating the film. In addition, these tools are relatively expensive to manufacture and, thus, are not widely available.

A similar tool is also available in which the pins are arranged in a circular row about the central plunger. Both the pins and the plunger are spring-loaded such that both the pins and the plunger can be depressed into the body of the tool. Because only a single circular row of pins is provided, however, alignment of the tool over the rivet is important to ensure proper removal of the air trapped around the rivet.

Other systems that have been considered are pounce wheels—wheels with a row of pins projecting from the outer surface of the wheel. Registration of these wheels is not required, but multiple passes are usually required to provide adequate placement of the holes. Using them typically results in additional unnecessary holes throughout the film because the user typically makes four or more straight rows of perforations around each rivet. Those additional perforations are not required to release the entrapped air, and may adversely affect the appearance and/or durability of the graphic.

In addition to pounce wheels with single rows of pins, multiple pounce wheels mounted on a single axle have been presented. When these devices are advanced over rivets, however, the pins surrounding the rivet are raised and do not form the perforations required to release entrapped air from around the rivet.

SUMMARY OF THE INVENTION

The present invention provides tools and methods for releasing air entrapped between sheeting material and a substrate around a rivet. The tools include movable pins biased outwardly by a resilient member. As a result, the pins can retract when encountering a discontinuity on an otherwise planar surface, such as a rivet, while still allowing for perforation of the sheeting around the rivet. In one embodiment, the pins are located in an annular ring such that only rough alignment of the tool over the rivet is required while still ensuring that the sheeting will be perforated around substantially the entire rivet. In another embodiment, the pins are located about a cylindrical tool faces that is rolled over the rivet.

One advantage of the tools and methods of the invention is that, due to the movable pins and their arrangement, the tools need not be accurately registered over a rivet to ensure effective operation as with known tools. In addition, time required to use the tools is reduced, allowing for faster, more efficient application of sheeting materials. Other advantages include the ability to remove unnecessary pins, if desired, as well to replace pins as they become dulled or are broken.

In one aspect, the present invention provides a tool for the application of sheeting to a surface, the tool including a handle; a face; a plurality of pins protruding from the face, each pin of the plurality of pins being mounted for movement along an axis and biased in a first direction along the axis, wherein the plurality of pins are arranged on the face in an annular ring that has an inner radius and an outer radius, wherein at least one of the pins is located on an inner edge of the annular ring and at least one of the pins is located on an outer edge of the annular ring, and further wherein a radial distance between the inner radius and outer radius is greater than the thickness of one of the pins; and at least one resilient member biasing the plurality of pins in the first direction.

In another aspect, the present invention provides a tool for the application of sheeting to a surface, the tool including a handle; a face having a center; a plurality of pins protruding from the face, each pin of the plurality of pins being mounted for movement along an axis and biased in a first direction along the axis, wherein the plurality of pins are arranged on the face in at least two different distances from the center of the face; and at least one resilient member biasing the plurality of pins in the first direction.

In another aspect, the present invention provides a tool for the application of sheeting to a surface, the tool including a cylinder mounted for rotation about an axis, the cylinder having an outer face; a plurality of pins protruding from the outer face of the cylinder, the pins being spaced about a circumference of the cylinder, wherein the pins are mounted for movement along radii extending from the axis, and further wherein each pin of the plurality of pins is biased radially away from the axis; and at least one resilient member biasing the plurality of pins radially away from the axis.

In another aspect, the present invention provides a method of releasing air entrapped between sheeting material and a substrate by providing a tool having a face; a plurality of pins protruding from the face, each pin of the plurality of pins being mounted for movement along an axis and biased in a first direction along the axis, wherein the plurality of pins are arranged on the face in an annular ring that has an inner radius and an outer radius, wherein at least one of the pins is located on an inner edge of the annular ring and at least one of the pins is located on an outer edge of the annular ring, and further wherein a radial distance between the inner radius and outer radius is greater than the thickness of one of the pins; and at least one resilient member biasing the plurality of pins in the first direction. The method further includes locating the face of the tool over a rivet covered by the sheeting material, wherein at least some of the pins are located directly over the rivet and some of the pins are located around a perimeter of the rivet; and forcing the tool against the sheeting material, wherein the pins located directly over the rivet are moved in a direction opposite the first direction, and wherein at least some of the pins located around the perimeter of the rivet perforate the sheeting material, whereby air entrapped between the sheeting material and the substrate can be released.

In another aspect, the present invention provides a method of releasing air entrapped between sheeting material and a substrate by providing a tool including a cylinder mounted for rotation about an axis, the cylinder having an outer face; a plurality of pins protruding from the outer face of the cylinder, the pins being spaced about a circumference of the cylinder, wherein the pins are mounted for movement along radii extending from the axis, and further wherein each pin of the plurality of pins is biased radially away from the axis; and at least one resilient member biasing the plurality of pins in the first direction. The method further includes locating the tool over a rivet covered by the sheeting material, wherein at least some of the pins are located directly over the rivet and some of the pins are located around a perimeter of the rivet; and forcing the tool against the sheeting material, wherein the pins located directly over the rivet are moved in a direction opposite the first direction, and wherein at least some of the pins located around the perimeter of the rivet perforate the sheeting material, whereby air entrapped between the sheeting material and the substrate can be released.

These and other features and advantages of the tools and methods of the invention are described in more detail below with respect to some illustrative embodiments.

DETAILED DESCRIPTION OF ILLUSTRATIVE EMBODIMENTS OF THE INVENTION

Figure 1:
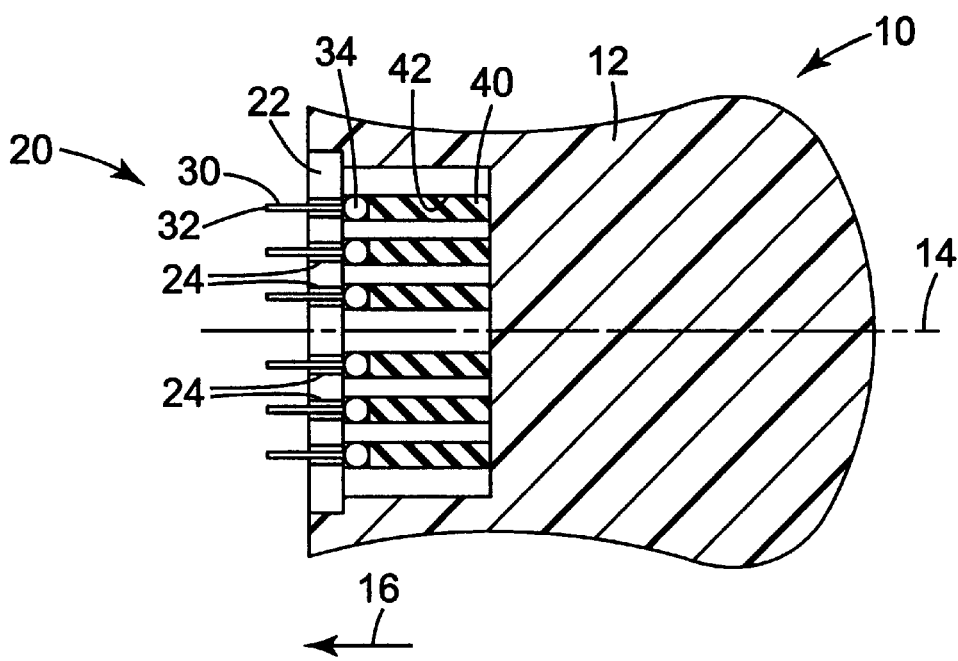
FIG. 1 is a cross-sectional view of one tool according to the present invention.

FIG. 1 depicts one illustrative embodiment of a tool according to the present invention. The tool 10 includes a handle portion 12 and a face 20. The face in this embodiment is in the form of a face plate 22 from which a plurality of pins 30 protrude. The pins 30 protrude through pin guides 24 formed in the face plate 22. The pin guides 24 are preferably long enough to prevent substantially deflection of the pins 30 from side-to-side, constraining them, instead, to substantially translational motion parallel to the axis 14.

The pins 30 include a point 32 that is preferably sufficiently sharp to penetrate the sheeting materials with which the tool 10 is to be used. At the opposite end, the pins 30 preferably include a head 34 that is larger than the pin guides 24 formed in the face plate 22. The face plate 22 can be secured to the tool 10 by any suitable technique.

The pins 30 are biased in the direction of arrow 16 by a plurality of resilient members 40 located within cavities 42 formed in the tool 10. In one embodiment, the resilient members 40 may take the form of coil springs. Other alternatives include elastic materials, such as foams, rubbers, etc. In still other alternatives, air or other compressible gases could be used to bias the pins in the direction of arrow 16. Regardless of the actual materials used for the resilient members 40, the pins 30 are preferably capable of moving independently within their respective pin guides 24.

Figure 2:
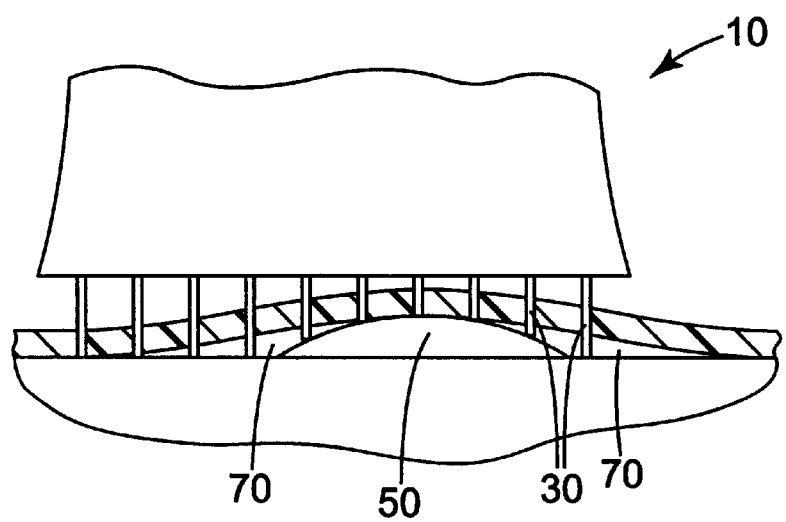
FIG. 2 illustrates use of the tool of FIG. 1 over a rivet.

Referring now to FIG. 2, the independent movement of the pins 30 allows the tool 10 to be effectively used over a rivet 50 that is covered by sheeting material 60. The sheeting material 60 entraps air in the space 70 about the rivet 50. When the tool is located over the rivet 50, the pins 30 located directly over the rivet 50 are pushed back towards the tool 10. In contrast, the pins 30 that are located around the rivet 50 can perforate the sheeting 60. After the sheeting 60 is perforated it can be smoothed down around the rivet 50 because the air entrapped in space 70 can escape through the holes formed in the sheeting.

Figure 3A:
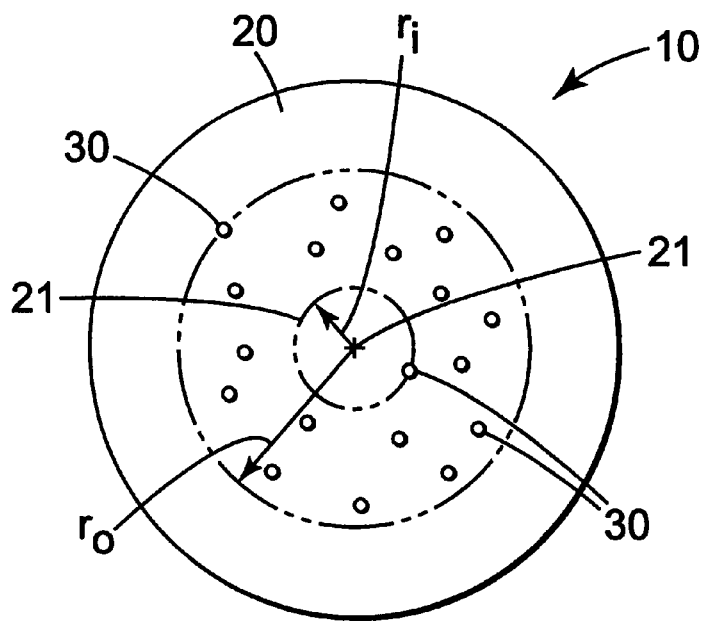
FIG. 3A is a view of the face of the tool of FIG. 1.

FIG. 3A is a view of the face 20 of the tool 10 illustrating the distribution of the pins 30 across the face 20. The pins 30 are located in an annular ring on the face 20 of the tool 10 as shown. The annular ring has an inner radius ($r_i$) and an outer radius ($r_o$) measured from a center 21 of the face 20. At least one of the pins 30 is located on the inner edge of the annular ring and at least one of the pins 30 is located on the outer edge of the annular ring. In addition, the radial distance between the inner and outer radii is greater than thickness of one of the pins 30. It may be preferred that the radial distance between the inner and outer radii be about 0.125 inch or more. Alternatively, the radial distance between the inner and outer radii may be about 0.25 inch or more. The inner radius may preferably be about 0.25 inch or less. Alternatively, the inner radius may be about 0.125 inch or less. The outer radius may preferably be about 0.5 inch or more. Alternatively, the outer radius may be about 0.75 inch or more. In yet another alternative, the outer radius may be about 1.5 inches or more. By distributing the pins 30 over the annular ring discussed above, the tool 20 can be used to release air entrapped around rivets of many different sizes. It is also preferred that the pins 30 in the annular ring be substantially evenly spaced. In one embodiment, the pins 30 are spaced about 0.25 inches apart.

Figure 3B:
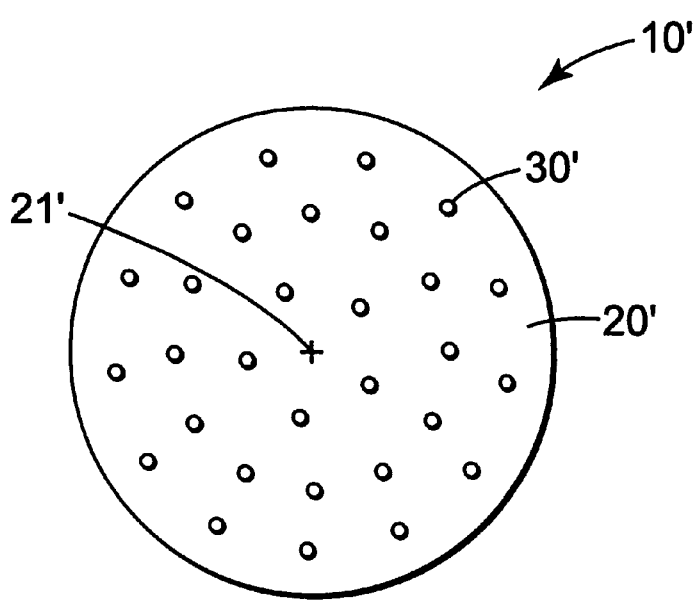
FIG. 3B is a view of the face of an alternate tool illustrating a different pin distribution pattern.

FIG. 3B is a view of the face 20' of an alternative tool 10' illustrating an alternate distribution of the pins 30' over the face 20' of the tool 10'. One preferred distribution is illustrated in which the pins 10' are distributed over substantially all of the face 20'. This distribution may, in some respects, be viewed as a variation of the annular distribution illustrated in FIG. 3A in which the inner radius is about zero. By distributing the pins 10' over substantially all of the face 20', the tool 20' can be used to release air entrapped around rivets of many different sizes. It may be preferred that the spacing between the pins 10' be substantially evenly spaced over the face 20'. For example, the pins 10' may be spaced about 0.25 inches apart.

One common feature among the pin distributions illustrated in FIGS. 3A & 3B is that the pins 30/30' are found at different distances from a center point of the face 20/20'. For example, the pins 30 on tool 10 are located at varying distances that are limited by the annular ring. The pins 10' are also located at varying distances from the center 21' of the face 20', with a pin even potentially being located at the center 21' of the face 20' of the tool 10'. The number of different distances between the center of the face and the pins may be as few as two, or as many as two or more. For example, a tool may be provided with two circular rows of pins located at different distances from the center of the tool's face.

Referring again to FIGS. 1 & 2, the pins 30 are preferably removable if desired, such that the distribution of pins 30 can be tailored to a specific application. For example, the outermost pins 30 may be removed if the tool 10 is being used over smaller rivets, because the sheeting is preferably perforated primarily in the areas surrounding the rivet and beneath which air is likely to be entrapped. In addition, the pins 30 can be individually replaced if they become too dull or are bent or broken during use.

Figure 4:
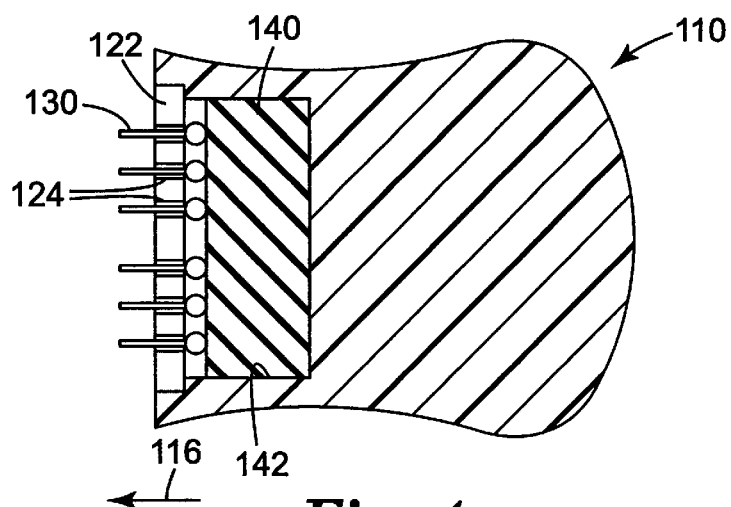
FIG. 4 is a cross-sectional view of another tool according to the present invention.

FIG. 4 depicts an alternative embodiment of the tools according to the present invention. The construction of the tool 110 is similar to the construction of tool 10 in many respects. The differences lie primarily in the mechanism used to bias the pins 130 in the direction of arrow 116. In this embodiment, the pins 130 are biased against the face plate 122 by a single resilient member 140 located within a cavity 142 formed in the tool 110. The resilient member 140 can be made of, e.g., foams, rubbers, thermoplastic elastomers, etc.

Regardless of the actual materials used for resilient member 140, the pins 130 are preferably capable of moving independently within their respective pin guides 124. That independent movement allows the tool 110 to be effectively used over rivets because the pins located directly over the rivet will be pushed back towards the cavity 142 in the tool 110. In contrast, the pins 130 that are located around the rivet can perforate the sheeting to allow the entrapped air to escape.

Figure 5:
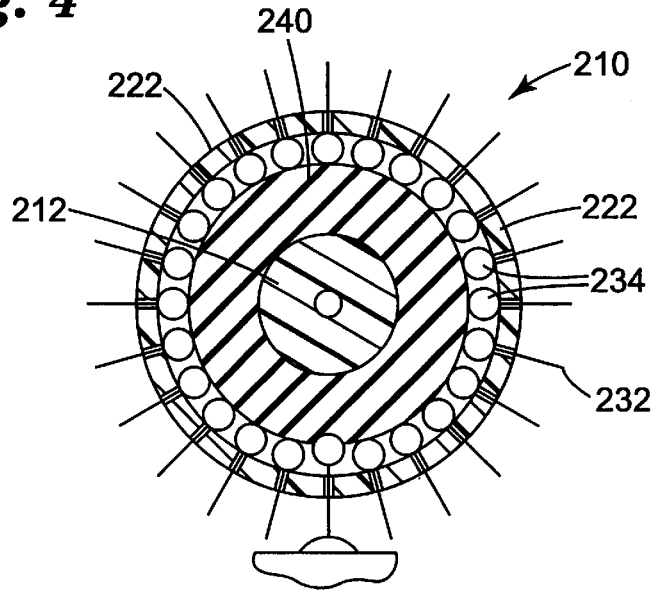
FIG. 5 is a cross-sectional view of a rotary tool according to the present invention, the cross-sectional view taken transverse to the tool's axis of rotation.
Figure 6:
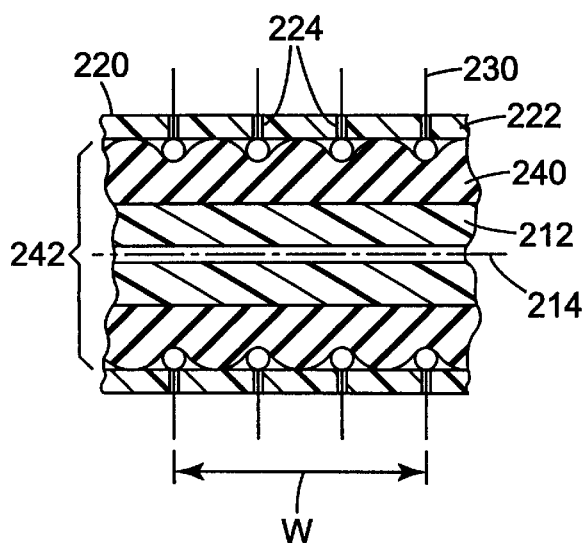
FIG. 6 is a cross-sectional view of the rotary tool of FIG. 5, the cross-sectional view taken along the tool's axis of rotation.

FIGS. 5 & 6 illustrate another embodiment of a tool 210 according to the present invention. The tool 210 includes a hub 212 that defines an axis 214 about which the tool 210 rotates. Pins 230 protrude from the outer face 220 in this embodiment. The outer face 220 is preferably in the form of a right circular cylinder 222 that includes pin guides 224 formed therethrough. The pin guides 224 are arranged along radii extending from the axis 214 and are preferably long enough to prevent substantially deflection of the pins 230 from side-to-side, constraining them, instead, to substantially translational motion along radii extending from the axis 214.

The pins 230 each include a point 232 that is preferably sufficiently sharp to penetrate the sheeting materials with which the tool 210 is to be used. At the opposite end, the pins 230 preferably include a head 234 that is larger than the pin guides 224 formed in the cylinder 222. The cylinder 222 can be secured to the tool 210 by any suitable technique.

The pins 230 are biased outwardly along radii extending from axis 214 by a resilient member 240 located within cavity 242 formed in the tool 210. The resilient member 240 can be made of, e.g., foams, rubbers, thermoplastic elastomers, etc.

Regardless of the actual material or materials used for resilient member 240, the pins 230 are preferably capable of moving independently within their respective pin guides 224. That independent movement allows the tool 210 to be effectively used over rivets because the pins 230 located directly over the rivet will be pushed back towards the cavity 242 in the tool 210. In contrast, the pins 230 that are located around the rivet can perforate the sheeting to allow the entrapped air to escape.

The pins 230 are preferably provided in rows, each of which extends about the circumference of the cylinder 222. The width w along axis 214 over which the pins 230 are distributed along the cylinder 222 is preferably larger than the radius of the largest rivet over which the tool 210 is to be used. As a result, when the tool 210 is rolled over a rivet, the pins 230 can perforate the sheeting on all sides of the rivet in a single pass over the rivet.

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated in total.

Various modifications and alterations of this invention will become apparent to those skilled in the art without departing from the scope of this invention, and it should be understood that this invention is not to be unduly limited to illustrative embodiments set forth herein, but is to be controlled by the limitations set forth in the claims and any equivalents to those limitations.

What is claimed is:

1. An air-release tool for the application of sheeting to a surface, the tool comprising:
   a handle;
   a face;
   a plurality of pins protruding from the face, each pin of the plurality of pins being mounted for movement along an axis and biased in a first direction along the axis, wherein the plurality of pins are arranged on the face in an annular ring that has an inner radius and an outer radius, wherein at least one of the pins is located on an inner edge of the annular ring and at least one of the pins is located on an outer edge of the annular ring, and further wherein a radial distance between the inner radius and the outer radius is greater than the thickness of one of the pins; and
   at least one resilient member biasing the plurality of pins in the first direction.

2. The tool of claim 1, wherein the radial distance between the inner and the outer radii is about ⅛ inch or more.

3. The tool of claim 1, wherein the radial distance between the inner and the outer radii is about ¼ inch or more.

4. The tool of claim 1, wherein the inner radius is about ⅛ inch or less.

5. The tool of claim 1, further comprising a plurality of pin guides in the face, wherein a portion of each pin of the plural of pins is located within one of the pin guides.

6. The tool of claim 1, wherein the tool comprises only one resilient member that biases all of the plurality of pins in the first direction.

7. The tool of claim 6, wherein the resilient member comprises resilient foam.

8. The tool of claim 1, wherein each pin in the plurality of pins moves along the axis independently of the other pins.

9. The tool of claim 8, wherein the at least one resilient member comprises a plurality of resilient members.

10. The tool of claim 9, wherein the plurality of resilient members comprises one resilient member for each of the pins.

11. The tool of claim 10, wherein each resilient member of the plurality of resilient members is located within a cavity aligned with one of the at least one resilient member comprises a coil spring.

12. An air-release tool for the application of sheeting to a surface, the tool comprising:
   a handle;
   a face having a center;
   a plurality of pins protruding from the face, each pin of the plurality of pins being mounted for movement along an axis and biased in a first direction along the axis, wherein the plurality of pins are arranged on the face in at least two different distances from the center of the face; and
   at least one resilient member biasing the plurality of pins in the first direction.

13. The tool of claim 12, wherein the pins are distributed over substantially all of the face.

14. The tool of claim 12, further comprising a plurality of pin guides in the face, wherein a portion of each pin of the plurality of pins is located within one of the pin guides.

15. The tool of claim 12, wherein the tool comprises only one resilient member that biases all of the plurality of pins in the first direction.

16. The tool of claim 15, wherein the resilient member comprises resilient foam.

17. The tool of claim 12, wherein each pin in the plurality of pins moves along the axis independently of the other pins.

18. The tool of claim 17, wherein the at least one resilient member comprises a plurality of resilient members.

19. The tool of claim 18, wherein the plurality of resilient members comprises one resilient member for each of the pins.

20. The tool of claim 19, wherein each resilient member of the plurality of resilient members is located within a cavity aligned with one of the at least one resilient member comprises a coil spring.

\* \* \* \* \*

UNITED STATES PATENT AND TRADEMARK OFFICE
CERTIFICATE OF CORRECTION

PATENT NO. : 6,311,399 B1
DATED : November 6, 2001
INVENTOR(S) : Steelman, Ronald S.

It is certified that error appears in the above-identified patent and that said Letters Patent is hereby corrected as shown below:

Column 2,
Line 13, delete "faces" and insert in place thereof -- face --.

Column 3,
Line 61, insert -- 20 -- following "face" and preceding "in".

Column 4,
Lines 56, 60, 63 and 64, delete "pins 10'" and insert in place thereof -- pins 30' --.
Line 61, delete "tool 20'" and insert in place thereof -- tool 10' --.

Column 5,
Line 3, delete "pins 10'" and insert in place thereof -- pins 30' --.

Signed and Sealed this

Seventh Day of May, 2002

*Attest:*

JAMES E. ROGAN
*Attesting Officer*     *Director of the United States Patent and Trademark Office*